United States Patent [19]

Ouchi

[11] 4,131,095
[45] Dec. 26, 1978

[54] INTERNAL COMBUSTION ENGINE OPERATED ON A REFORMED GAS

[75] Inventor: Keido Ouchi, Ayase, Japan

[73] Assignee: Nissan Motor Company, Ltd., Japan

[21] Appl. No.: 778,425

[22] Filed: Mar. 17, 1977

[30] Foreign Application Priority Data

Mar. 19, 1976 [JP] Japan ............................ 51-30579

[51] Int. Cl.² ............................................ F02M 25/06
[52] U.S. Cl. .................................. 123/59 EC; 123/3; 123/119 A; 123/119 LR; 123/75 C; 123/90.18
[58] Field of Search .......... 123/59 EC, 3, 1 A, 90.18, 123/119 A, 119 LR, 75 C; 261/44 C

[56] References Cited

U.S. PATENT DOCUMENTS

| 2,113,602 | 4/1938 | Pratt | 123/59 EC |
| 3,023,870 | 3/1962 | Udelman | 123/90.18 |
| 3,776,207 | 12/1973 | Simko | 123/119 A |
| 3,779,013 | 12/1973 | Faber et al. | 123/119 A |
| 3,805,752 | 4/1974 | Cataldo | 123/59 EC |
| 3,958,540 | 5/1976 | Siewert | 123/59 EC |
| 4,041,910 | 8/1977 | Houseman | 123/119 A |

FOREIGN PATENT DOCUMENTS 2623677 9/1976 Fed. Rep. of Germany.

Primary Examiner—Charles J. Myhre
Assistant Examiner—Jeffrey L. Yates

[57] ABSTRACT

When a lower engine power output is required, one of the combustion chambers acts as a reformer operable to convert a mixture of an ordinary fuel and air into a reformed gas which is introduced into the other combustion chambers for the power generating combustion thereof. On the contrary, when a higher engine power output is required, all the combustion chambers are subjected to power generating combustion of a stoichiometric air-fuel mixture.

10 Claims, 5 Drawing Figures

INTERNAL COMBUSTION ENGINE OPERATED ON A REFORMED GAS

The present invention relates in general to an internal combustion engine system and more particularly to an internal combustion engine system of a kind which can be operated on a reformed gas produced through chemical reformation of an ordinary fuel typified by gasoline.

It is well known in the art that one of the best ways to solve the problem of the atmospheric pollution by exhaust gases of internal combustion engines is to operate the engines with a gaseous fuel or reformed gas which contains as combustible components, hydrogen ($H_2$) and/or carbon monoxide (CO) and is obtained through, for example partial oxidation of, or water gas reaction with an ordinary fuel in the presence of a catalyst. Many available fuels can be used as a starting material for producing such reformed gas. These are, for example, alcohols such a methanol and ethanol, and petroleum fuels typified by gasoline.

In fact, the above-mentioned reformed gas can stably combust in the engine even under remarkably lean mixture condition thereof, thus inducing that the engine operated on such reformed gas exhibits its stable operation with extremely low noxious gas emissions and improved mileage.

However, it is unwantedly observed that the reformed gas is subjected to extremely large volume expansion during the reforming process. Thus, the real amount of combustible components actually fed into the engine becomes very low thereby causing the engine power output to decrease extremely. Although a so-called super-charging system can be used for solving the abovementioned problem, such system has a very complicated structure and is very expensive.

Therefore, a first object of the present invention is to eliminate the drawbacks encountered in the conventional internal combustion engine system operated on reformed gas.

A second object of the present invention is to provide an internal combustion engine system which is constructed to operate on a reformed gas in case of relatively light or low load operation thereof, and to operate on an ordinary fuel typified by gasoline in case of relatively heavy or high load operation thereof.

A third object of the present invention is to provide an internal combustion combustion engine system which is constructed to make at least one of the combustion chambers thereof to act as a reformer capable of converting an ordinary fuel into a reformed gas.

According to the present invention, there is provided an internal combustion engine system having an engine proper forming therein first and second combustion chambers, and an exhaust manifold fluidly communicable with the second combustion chamber, the system comprising: first mixture supply means for supplying an air-fuel mixture having a first predetermined air-fuel ratio into the first combustion chamber when actuated; second mixture supply means for supplying an air-fuel mixture having a second predetermined air-fuel ratio into the first combustion chamber when actuated; third mixture supply means for supplying an air-fuel mixture having the second predetermined air-fuel ratio into the second combustion chamber when actuated; first exhaust means for feeding a first product produced in the first combustion chamber into the second combustion chamber when actuated; second exhaust means for feeding a second product produced in the first combustion chamber into the exhaust manifold when actuated; and control means for initiating the actuations of the first mixture supply means and the first exhaust means and also discontinuing the actuations of the second and third mixture supply means and the second exhaust means when a lower engine power output is required, and for initiating the actuations of the second and third mixture supply means and the second exhaust means and also discontinuing the actuations of the first mixture supply means and the first exhaust means when a high engine output power is required.

Other objects and advantages of the present invention will become more apparent from the following detailed description when taken in conjunction with the accompanying drawings, in which.

Figure 1:
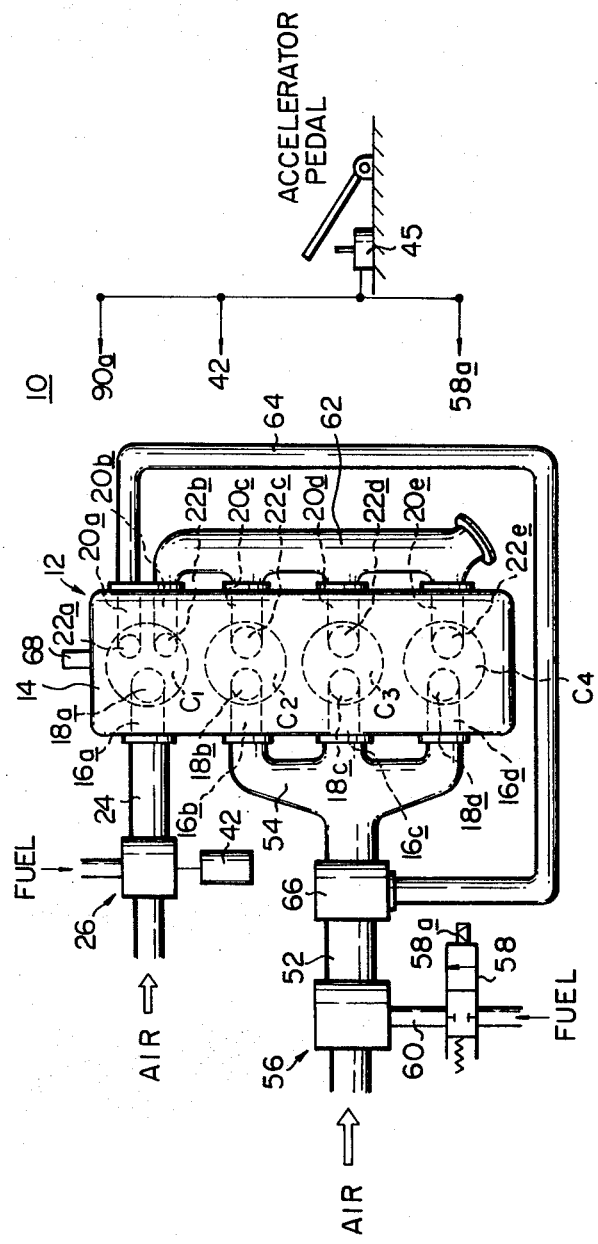
FIG. 1 is a sketch of a first preferred embodiment of an internal combustion engine system according to the present invention.
Figure 2:
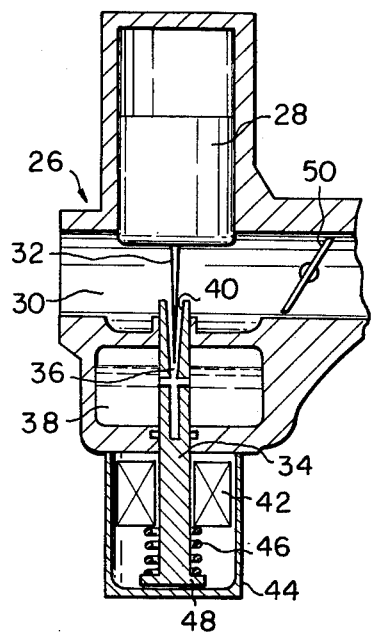
FIG. 2 is a sketch in section of a first electromagnetic carburetor employed in the engine system shown in FIG. 1.
Figure 3:
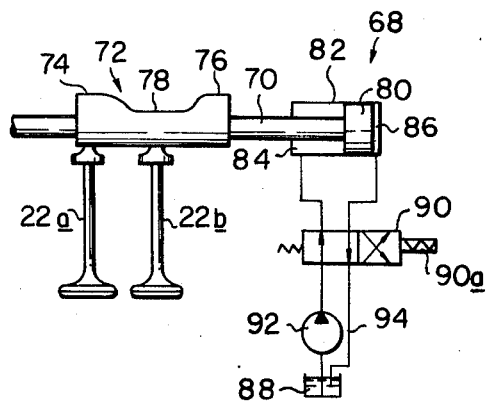
FIG. 3 is a sketch of an electromagnetic valve controller employed in the engine system shown in FIG. 1.

Referring to FIGS. 1 to 3, particularly to FIG. 1, there is illustrated an internal combustion engine system 10 which is the first preferred embodiment of the present invention.

The engine system 10 comprises an engine proper 12 in which four combustion chambers $C_1$, $C_2$, $C_3$ and $C_4$ are defined between pistons (not shown) reciprocating in respective cylinders of a cylinder block (no numeral) and recesses formed in a cylinder head 14, as is customary in the art. Ignition plugs (not shown) are mounted in the combustion chambers in a conventional manner. The cylinder head 14 is formed at its one or left side with four intake port inlets 16a, 16b, 16c and 16d which are respectively communicable through intake valves 18a, 18b, 18c and 18d with the combustion chambers $C_1$ to $C_4$, and at its other or right side with five exhaust port outlets 20a, 20b, 20c, 20d and 20e. The exhaust port outlets 20a and 20b are communicable through respective exhaust valves 22a and 22b with the combustion chamber $C_1$, and the remaining exhaust port outlets 20c, 20d and 20e are communicable through respective exhaust valves 22c, 22d and 22e with the combustion chambers $C_2$, $C_3$ and $C_4$, as shown. Now, it should be noted that the combustion chamber $C_1$ is constructed to act as a reformer to convert the ordinary fuel into the reformed gas. The reason why the chamber $C_1$ operates such will be apparent from the following description.

Communicating through a passage 24, with the intake port inlet 16a is a first air-fuel mixture supply means 26 which is constructed to supply a stoichiometric air-fuel mixture and extremely rich air-fuel mixture (for example, excess air factor: about 0.3 to about 0.5) to the combustion chamber $C_1$ in response to the required engine power output. Construction of the first air-fuel mixture supply means 26 is well shown in FIG. 2. The means 26 is a carburetor which can be prepared by modifying a conventional constant vacuum carburetor. As shown, the means 26 generally comprises a piston 28 projectable into a venturi throat portion 30 to vary the area of the same. The movement of the piston 28 is controlled to maintain the vacuum at the venturi throat portion 30 generally constant. A tapered metering pin 32 is fixed to the piston 28 for movement therewith. A rod member 34 forming therein a fuel jet passage 36 communicating with a float chamber 38 is sealably and slidably passed through the float chamber 38 in such an arrangement that the fuel jet passage 36 receives therein the head of the metering pin 32. As shown, the fuel jet passage 36 is formed tapered at a portion 40 thereof receiving the head portion of the pin 40. Thus, it will be appreciated that the movement of the piston 28 induces variation of the fuel jet orifice.

Surrounding a downwardly protruding portion of the rod member 34 is a solenoid 42 which is stationarily mounted in a casing 44 and electrically connected to an accelerator pedal switch 45. A spring 46 is disposed between a flange portion 48 of the rod member 34 and a stationary member such as the solenoid 42 in order to urge the rod member 34 to move downwardly of the rod member 34 to disengage from the metering pin 32. Thus, it will be understood that, under a stationary condition of the metering pin 32, when the solenoid 42 is energized, the rod member 34 is moved upwardly against the force of the spring 46 to decrease the opening degree of the fuel jet orifice and when the coil 42 is de-energized, the rod member 34 returns to its rest position by the force of the spring 46 to increase the opening degree of the fuel jet orifice. It should be noted that the stoichiometric air-fuel mixture supply takes place when the solenoid 42 is energized and the extremely rich air-fuel mixture supply takes place when the solenoid 42 is de-energized.

The accelerator pedal switch 45 is constructed to close its circuit for the energization of the solenoid 42 when the accelerator pedal is depressed beyond a predetermined distance due to high power requirement of the engine.

Designated by the numeral 50 is a throttle valve which is operatively connected to the accelerator pedal through a conventional linkage (not shown).

With the construction of the first air-fuel mixture supply means 26, it will be readily understood that when the accelerator pedal is depressed beyond the predetermined distance, the means 26 produces the stoichiometric air-fuel mixture and when the accelerator pedal is left depressed within the predetermined distance, the means 26 produces the extremely rich air-fuel mixture.

Now, it should be noted that the extremely rich air-fuel mixture is subjected to partial oxidation in the combustion chamber $C_1$ by the existance of the compression heat of the chamber $C_1$ and the ignition by the ignition plug. Thus, the combustion chamber $C_1$ acts as a reformer when the accelerator pedal is left depressed within the predetermined distance.

Communicating through an intake passage 52 and an intake manifold 54 with the intake port inlets 16b, 16c and 16d is a second air-fuel mixture supply means 56 which is constructed to supply stoichiometric air-fuel mixture to the combustion chambers $C_2$ to $C_4$ when electrically energized and to stop the fuel supply but not air supply when de-energized. For making the second air-fuel mixture supply means 56 to work like this, a solenoid valve 58 is employed, which is mounted in a fuel passage 60 and electrically connected at its solenoid 58a to the beforementioned accelerator pedal switch 45 in such an arrangement that when the switch 45 is closed, the solenoid 58a is energized to open the fuel passage 60 and when the switch 45 is open, the solenoid 58a is de-energized to close the fuel passage 60. Thus, it will be appreciated that when the accelerator pedal is depressed beyond the predetermined distance, the fuel passage 60 is open for providing the combustion chambers $C_2$ to $C_4$ with the stoichiometric air-fuel mixture.

Communicating with the exhaust port outlets 20b to 20e is an exhaust manifold 62 which is conventional.

Connecting the exhaust port outlet 20a to the intake passage 52 is an extra passage means which comprises a passage 64 and a mixing chamber 66. The extra passage means is used for transmitting products produced in the combustion chamber $C_1$ into the intake passage 52 and mixing the products with air passed through the second air-fuel mixture supply means 56 to produce a desired "air-reformed gas" mixture (excess air factor: about 1.0 to about 4.0) for the combustion chambers $C_2$ to $C_4$. As will be noted hereinlater, the transmittance of the reformed gas into the intake passage 52 occurs only when the engine 10 is subjected to low load operation.

In FIG. 3, an electromagnetic valve controller 68 is shematically illustrated as being incorporated with the above mentioned exhaust valves 22a and 22b. The controller 68 comprises a straight shaft 70 provided thereon with a cam member 72 which consists of spaced two eccentric portions 74 and 76 and a concentric portion 78 which are slidably engageable with stem portions of the exhaust valves 22a and 22b in a manner as will be described hereinlater. One end of the shaft 70 is formed into a piston 80 which is slidably and sealably disposed in a cylinder 82 to define first and second variable chambers 84 and 86 at both sides of the piston 80. These chambers 84 and 86 are communicating with a fluid reservoir 88 through a two position solenoid valve 90 and a fluid pump 92 in such an arrangement that the fluid pumped up from the reservoir 88 is alternatively fed into the chambers 84 and 86. For this, the two position solenoid valve 90 is arranged to provide direct fluid communications between the chamber 86 and the pump 92 and between the chamber 84 and a drain passage 94 when the solenoid 90a of the valve 90 is energized, and to provide direct communications between the chamber 84 and the pump 92 and between the chamber 86 and the drain passage 94 when the solenoid 90a is de-energized. Thus, it will be appreciated that when the solenoid 90a of the valve 90 is energized, the fluid from the pump 92 is fed into the chamber 86 to move the piston leftward of the drawing with a result that the right eccentric portion 76 of the cam member 72 engages the stem of the exhaust valve 22b and simultaneously the concentric portion 78 engages the stem of the exhaust valve 22a, and when the solenoid of the valve 90 is de-energized, the fluid from the pump 92 is fed into the chamber 84 to move the piston 80 rightward with a result that the left eccentric portion 74 of the cam member 72 engages the stem of the exhaust valve 22a and simultaneously the concentric portion 78 engages the exhaust valve 22b. Briefly, the energization of solenoid 90a induces the functional operation of the exhaust valve 22b only and the de-energization of the solenoid 90a induces the functional operation of the exhaust valve 22a only.

By the above-stated construction of the engine system 10 of the first embodiment of the present invention, the following operations will be carried out.

While the accelerator pedal is left depressed within the predetermined distance, that is, not depressed beyond the predetermined distance because of low load cruising of the vehicle, the accelerator pedal switch 45 is maintained in open state thereby inducing de-energization of the solenoids 42, 58a and 90a of the first air-fuel mixture supply means 26, the second air-fuel mixture supply means 56 and the two position solenoid valve 90 respectively. In this state, the first air-fuel mixture supply means 26 operates to supply the predetermined extremely rich air-fuel mixture to the combustion chamber $C_1$ for producing the reformed gas therein, and the second air-fuel mixture supply means 56 stops to feed fuel into the intake manifold 54, and simultaneously, the exhaust valve 20a functions to feed the reformed gas thus produced in the combustion chamber $C_1$ into the combustion chambers $C_2$ to $C_4$ through the extra passage means 64 and 66, together with air being passed through the second air-fuel mixture supply means 56. The exhaust valve 22b stays at its closed position. Accordingly, in this light or low load condition of the engine 10, the combustion chambers $C_2$ to $C_4$ are subjected to power generating combustion of the "air-reformed gas" mixture and the combustion chamber $C_1$ acts as a reformer. Under this, the engine 10 operates with extremely low noxious emissions.

On the contrary, when the accelerator pedal is depressed beyond the predetermined distance for high engine power requirement, the accelerator pedal switch 45 closes thereby inducing energization of the solenoids 42, 58a and 90a. In this case, the first air-fuel mixture supply means 26 operates to supply the stoichiometric air-fuel mixture to the combustion chamber $C_1$ for the power generating combustion of the mixture, and the second air-fuel mixture supply means 56 operates to supply the stoichiometric air-fuel mixture into the combustion chambers $C_2$ to $C_4$ and the exhaust valve 22b functions to exhaust the gas produced in the combustion chamber $C_1$ into the exhaust manifold 62, and simultaneously, the exhaust valve 22a is maintained at its closed position. Thus, in this heavy or high load condition of the engine 10, all the combustion chambers $C_1$ to $C_4$ are subjected to power generating combustion of the normal and stoichiometric air-fuel mixture to obtain high engine power output.

Figure 4:
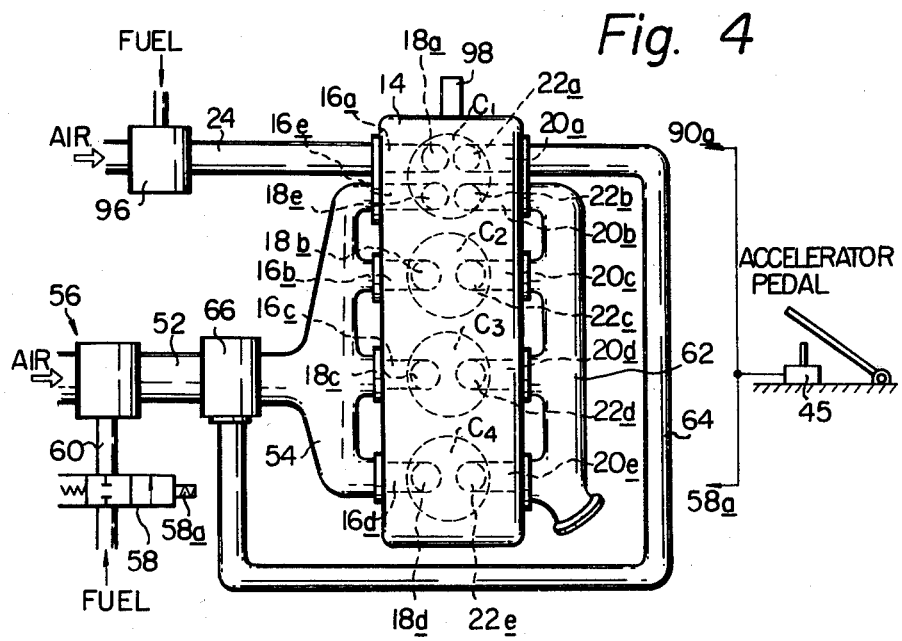
FIG. 4 is a sketch of a second preferred embodiment of an internal combustion engine system according to the present invention.
Figure 5:
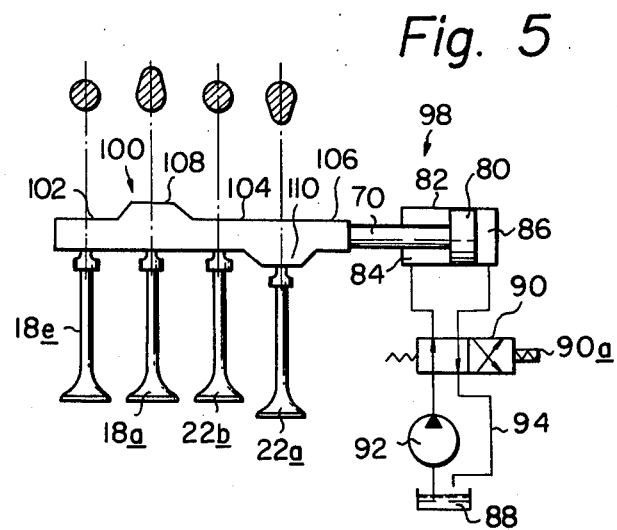
FIG. 5 is a sketch of an electromagnetic valve controller employed in the engine system shown in FIG. 4.

Referring to FIGS. 4 and 5, particularly to FIG. 4, there is shown a second preferred embodiment of an internal combustion engine system 10' according to the present invention.

The combustion engine system 10' of this embodiment comprises generally same parts as in the case of the engine system 10 of the first preferred embodiment. The parts similar to those of the first preferred embodiment are designated by the same numerals as in the case of FIGS. 1 to 3. In this second embodiment, an additional intake port inlet 16e is further formed in the cylinder head 14 to provide a fluid communication between the intake manifold 54 and the combustion chamber $C_1$. Designated by the numeral 18e is an intake valve for the additional intake port inlet 16e. Furthermore, in this second embodiment, a third air-fuel mixture supply means 96 is employed communicable with the combustion chamber $C_1$ as a substitute for the first air-fuel mixture supply means 26 of the first preferred embodiment. The third air-fuel mixture supply means 96 is constructed to supply extremely rich air-fuel mixture to the combustion chamber $C_1$ when the intake valve 18a operates normally. Furthermore, in this embodiment, an electromagnetic valve controller 98 is used as a substitute for the controller 68 of the first embodiment.

In FIG. 5, the controller 98 is shown as comprising generally same parts as in the case of FIG. 3 except for a cam member 100. The cam member 100 consists of spaced three concentric portions 102, 104 and 106 and spaced two eccentric portions 108 and 110, the eccentric portions 108 and 110 being located between the concentric portions 102 and 104 and between the concentric portions 104 and 106, respectively. As shown, the two eccentric portions 108 and 110 are formed to extend opposite from each other. The stem portions of the valves 18e, 18a, 22b and 22a are respectively engageable with each two portions 102 and 108; 108 and 104; 104 and 110; and 110 and 106 in response to the reciprocating movement of the piston in the cylinder 82. More specifically, in this valve controller 98, the energization of the solenoid 90a induces the normal operations of the intake valve 18e and the exhaust valve 22b, only. On the contrary, the de-energization of the solenoid 90a induces the normal operations of the intake valve 18a and the exhaust valve 22a.

Thus, in the engine system 10' of the second embodiment, the following operations will be carried out.

While the accelerator pedal is left depressed within the predetermined because of low load cruising of the vehicle, the accelerator pedal switch 45 is maintained open thereby inducing the de-energization of the solenoid 58a and 90a of the second air fuel mixture supply means 56 and the valve controller 98, respectively. In this state, the second air-fuel mixture supply means 56 stops to feed fuel into the intake manifold 54, and simultaneously, the intake valve 18a and the exhaust valve 22a function normally so that the extremely rich air-fuel mixture is fed into the combustion chamber $C_1$ to be converted into the reformed gas, and the reformed gas thus produced is fed into the combustion chambers $C_2$ to $C_4$ through the extra passage means 64 and 66 together with air being passed through the second air-fuel mixture supply means 56. Thus, it will be appreciated that under light or low load condition of the engine system 10', the power generating combustion of the "air-reformed gas" mixture is provided in the combustion chambers $C_2$ to $C_4$ and the combustion chamber $C_1$ acts as a reformer.

On the contrary, when the accelerator pedal is depressed beyond the predetermined distance at high power requirement, the accelerator pedal switch 45 closes thus inducing the energization of the solenoids 58a and 90a. In this case, the second air-fuel mixture supply means 56 operates to supply the stoichiometric air-fuel mixture into the intake manifold 54, the intake valve 18e and the exhaust valve 22b function normally, and simultaneously, the intake and exhaust valves 18a and 22a stay at their closed positions. Thus, in this heavy or high load condition of the engine system 10', all the combustion chambers $C_1$ to $C_4$ contribute substantially to the power generating combustion of the normal and stoichiometric air-fuel mixture to obtain high engine power output.

What is claimed is:

1. An internal combustion engine system having an engine proper forming therein at least first and second combustion chambers, and an exhaust manifold fluidly communicable with the second combustion chamber, said system comprising:
   first intake means for feeding first and second combustion mediums into said first combustion chamber when first and second conditions of said engine take place, respectively;

second intake means for feeding a third combustion medium into said second combustion chamber when said second condition takes place;

reformed gas transmitting means for transmitting a product produced in said first combustion chamber into said second combustion chamber when said first condition takes place;

exhaust means for feeding a product produced in said first combustion chamber into said exhaust manifold when said second condition takes place; and control means for causing said first and second conditions when lower and higher engine power outputs are required, respectively.

2. An internal combustion engine system as claimed in claim 1, in which said reformed gas transmitting means comprises a first exhaust valve operatively connected to said first combustion chamber; a first passageway providing first fluid communication between said first combustion chamber and a conduit portion of said second intake means via said first exhaust valve; and a mixing chamber disposed in said conduit portion for mixing the product coming from said first combustion chamber through said passage with air passed through said second intake means; further in which said exhaust means comprises a second exhaust valve operatively connected to said first combustion chamber at a position spaced from said first exhaust valve; and a second passageway providing second fluid communication between said first combustion chamber and said exhaust manifold via said second exhaust valve; said first and second exhaust valves being controlled in such a manner that when said first condition takes place, said second exhaust valve stays closed to shut said second passage, and when said second condition takes place, said first exhaust valve stays closed to shut said first passage.

3. An internal combustion engine system as claimed in claim 2, in which said first intake means is a first electromagnetic carburetor which is constructed to produce said second combustion medium when electrically energized and to produce said first combustion medium when de-energized.

4. An internal combustion engine system as claimed in claim 3, in which said second intake means is a second electromagnetic carburetor which is constructed to produce said second combustion medium when electrically energized and to pass through only air when de-energized.

5. An internal combustion engine system as claimed in claim 4, in which said control means comprises an electromagnetic valve controller controlling said first and second exhaust valves in such a manner that said first exhaust valve stays closed and simultaneously said second exhaust valve initiates the normal operation thereof when electrically energized, and said first exhaust valve initiates the normal operation thereof and simultaneously said second exhaust valve stays closed when de-energized; and an accelerator pedal switch for inducing the electric energization of said first electromagnetic carburetor, said second electromagnetic carburetor and said electromagnetic valve controller when the accelerator pedal is depressed beyond a predetermined distance.

6. An internal combustion engine system as claimed in claim 3, in which said first electromagnetic carburetor comprises a piston projectable into a venturi throat portion to vary the area of the same, the movement of said piston being so controlled as to maintain the vacuum at said venturi throat portion generally constant; a tapered metering pin fixed to said piston for synchronous movement therewith; a rod member forming therein a fluid jet passage communicating with a float chamber, said rod member being longitudinally slidably arranged so as to receive the leading portion of said metering pin into said fluid jet passage thereof; a spring for biasing said rod member to move in a direction to increase the opening area defined by said fluid jet passage and said leading portion of said metering pin; and a solenoid for causing said rod member to move in the opposite direction to decrease said opening area when electrically energized.

7. An internal combustion engine system as claimed in claim 5, in which said electromagnetic valve controller comprises a cam member having thereon two spaced eccentric portions and a concentric portion located between said eccentric portions, said cam member being rotated around its axis and axially slidable to take first and second positions, said first position being a position in which said first and second exhaust valve are slidably engaged with one of said eccentric portions and said concentric portion, respectively, said second position being a position in which said first and second exhaust valves are slidably engageable with said concentric portion and the other of said eccentric portions; a piston and cylinder unit operating to move said cam member into said first position when a fluid is fed into a first chamber defined in said unit and to move said cam member into said second position when a fluid is fed into a second member defined in said unit; and a two position electromagnetic valve disposed between said piston and cylinder unit and a fluid reservoir in such a manner that the fluid from said fluid reservoir is fed into said second chamber of said unit when electrically energized and the fluid from said fluid reservoir is fed into said first chamber of said unit when de-energized.

8. An internal combustion engine system as claimed in claim 1, in which the first combustion medium is richer than the second combustion medium.

9. An internal combustion engine system as claimed in claim 8, in which the first combustion medium is richer than the third combustion medium.

10. An internal combustion engine system as claimed in claim 9, in which the third combustion medium has a substantially stoichiometric air-fuel ratio.

* * * * *